United States Patent Office 3,133,084
Patented May 12, 1964

3,133,084
**1-HALO-1,2,3,3 - TETRA(NEGATIVELY SUBSTI-
TUTED)PROPENES AND SALTS THEREOF,
AND METHODS FOR PREPARING SAID
COMPOUNDS**
Elmore L. Martin, Wilmington, Del., assignor to E. I.
du Pont de Nemours and Company, Wilmington, Del.,
a corporation of Delaware
No Drawing. Filed June 24, 1960, Ser. No. 38,455
16 Claims. (Cl. 260—326.5)

This invention relates to a new class of organic acids, the 1-halo - 1,2,3,3 - tetra(negatively-substituted)propenes and salts thereof, and to methods for preparing these compounds.

A number of strong cyanocarbon acids and their salts have recently been prepared, including 2-halo-1,1,3,3-tetracyanopropene and its salts (J. Am. Chem. Soc. 80, 2795 (1958)). These compounds were prepared from tetracyanoethylene, often by a circuitous process.

It has now been found that a new class of organic acids, the 1 - halo-1,2,3,3-tetra(negatively-substituted)propenes, including 1-halo-1,2,3,3-tetracyanopropene, can be prepared by a direct process which does not involve the use of tetracyanoethylene. This process consists in reacting a 1,2 - dihalo-1,2-di(negatively-substituted)ethylene with an alkali metal salt of an active methylene compound.

The preferred organic acid products of this invention are characterized by the formula (1) 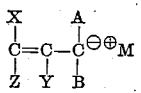

wherein A and B can be the same or different and are selected from the group consisting of CN, COR, COOR, $SO_2NR_2$, $SO_2R$, $CONR_2$, and CONHR, R being aliphatically saturated monovalent hydrocarbon of 1–18 carbons; A and B together (—A—B—) are selected from the group consisting of —CO—$(CH_2)_3$—CO—,

—CH=CH—CH=CH—  —CH=CH— 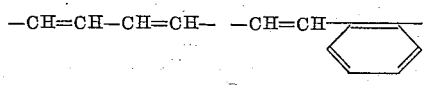

 and —CO—NH—CO—NH—CO—

X is a halogen atom, usually from the group consisting of fluorine, chlorine, and bromine; Y and Z can be the same or different and are selected from the group consisting of CN, COR, COOR, $SO_2R$, CONHR, and $CF_3$; and Y and Z together (—Y—Z—) are selected from the group consisting of

—CO—N—CO—
       |
       $C_6H_5$

—CO—$CH_2$—CO—, —CO—$CCl_2$—CO—, —$CF_2CF_2$—, and —$CF_2$—$CF_2$—$CF_2$—; with the proviso that at least two of A, B, Y and Z are CN; and M is selected from the group consisting of hydrogen, alkali metal cations, alkaline earth metal cations, and ammonium cations, including the ammonium cation and alkyl-substituted ammonium cations wherein each alkyl group contains 1–18 carbons. The term "alkyl-substituted ammonium cations" includes the mono-, di-, tri- and tetra-N-substituted ammonium cations.

Generally "R" will be alkyl of up to 7 carbons, cycloalkyl of up to 10 carbons, or aryl, alkaryl or aralkyl of up to 12 carbons.

Most preferred metals for use in the compounds of this invention are the alkali and alkaline earth metals of groups I-A and II-A having an atomic number less than 87, i.e., lithium, sodium, potassium, rubidium, cesium, beryllium, magnesium, calcium, strontium, and barium.

Examples of alkyl groups suitable for the alkyl-substituted ammonium cations are methyl, ethyl, propyl, butyl, 2-ethylhexyl, octadecyl, and the like.

The cation M can have a valence of 1 or 2, but the preferred valence of cation M is 1. Mixtures of cations can be used.

Examples of specific substituents for the group in Formula 1 are as follows:

Group X: fluorine, chlorine, bromine.
Groups A and B: —CN, —$COOC_2H_5$, —$COC_6H_5$, —$COCH_3$, —$CONHC_6H_5$, —$SO_2C_6H_5$,
—$SO_2C_6H_4CH_3(p)$,
—CO—$NHC_2H_5$, —CO—$N(C_2H_5)_2$,

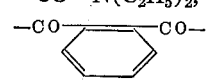

and —CO—NH—CO—NH—CO—
and —CO—$(CH_2)_3$CO—.

Groups Y and Z: —CN, —$COOCH_3$, —$COC_6H_5$, —$CF_3$, —CO—$N(C_6H_5)$—CO—, —$CF_2CF_2$—, and —CO—$CH_2$—CO—.

Group M: $H^+$, $Li^+$, $Na^+$, $K^+$, $Rb^+$, $Cs^+$, $Mg^{++}$, $Ca^{++}$, $[N(CH_3)_4]^+$, $[N(C_2H_5)_4]^+$ and $[N(C_3H_7)_4]^+$.

For convenience in naming the above salts, the 3-position of compound S is Equation 3 will be referred to as the corresponding 1-halo - 1,2,3,3 - (tetrasubstituted)propenide ion.

The acidic strengths of the acids are dependent upon the substituents. The acids containing three or four cyano groups generally react with alkali and alkaline earth metallic oxides, hydroxides, carbonates, and bicarbonates, ammonia and amines to form salts. Salts composed of the anion of the acids of this invention and alkali metal, alkaline earth metal, ammonium and substituted ammonium cations, range in color from deep red to yellow and are useful as dyes. The 1-halo-1,2,3,3-tetrasubstituted propenes often can be isolated as salts which can be crystallized from aqueous solutions merely by mixing an aqueous solution of the crude reaction mixture with an aqueous solution of an ammonium salt such as tetraalkyl-substituted ammonium halide.

The formation of the products of this invention can be represented by the following equations which are a preferred route:

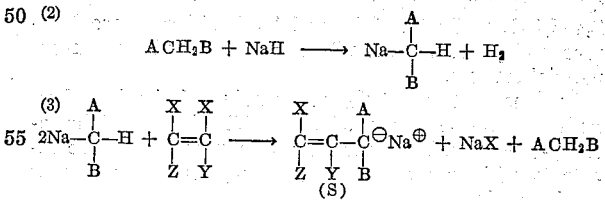

In these equations, A, B, X, Y, and Z have their same meanings as described above.

The active methylene compound, $ACH_2B$, and its monosodium derivative are known to the art as is the 1,2 - dihalo - 1,2 - di(negatively-substituted)ethylene compound

Instead of the monosodium derivative of the active methylene compounds, the analogous lithium, potassium, rubidium, and cesium derivatives can be used. These derivatives can all be prepared by treating the active methylene compound $ACH_2B$ with the metal or metal hydride by well-known methods described in the chemical literature. A specific description of one such process is given in the examples.

By the term "active methylene compound" is meant compounds containing the bivalent methylene radical which is bonded to two atoms, each of which is multiply bonded to another atom. The hydrogens of the methylene groups are activated in the sense that they can be replaced by an alkali metal such as sodium resulting in the formation of stable alkali metal derivatives of the active methylene compounds.

Examples of suitable well-known classes of active methylene compounds include the 1,3-diketones; ester, amide, and nitrile derivatives of malonic acid, acetoacetic acid, cyanoacetic acid, aroyl acetic acids, aryl acetic acids, alkyl sulfonyl acetic acids, and aryl sulfonyl acetic acids; bis[alkyl- and (aryl-)sulfonyl]methanes, esters, and amides of benzylsulfonic acid, and barbituric acid.

Especially useful specific active methylene compounds include malononitrile, diethyl malonate, ethyl cyanoacetate, p-toluenesulfonylacetonitrile, benzoylacetonitrile, 1,3-diphenyl-1,3-propanedione, acetyl acetone, ethyl acetoacetate, ethyl benzoylacetate, benzoylacetanilide, bis(phenylsulfonyl)-methane, benzenesulfonylacetonitrile, and α-cyanoacetanilide. All of the above compounds are well known in the chemical literature.

Monosodium derivatives of active methylene compounds can conveniently be prepared by treating the active methylene compound in an inert diluent at 0–10° C. with sodium hydride dispersed in mineral oil (general Equation 2). However, other well-known methods for preparing these derivatives can be used.

1,2 - dihalo - 1,2 - di(negatively - substituted)ethylenes are available commercially or can be prepared by known methods.

Examples of especially useful specific 1,2-dihalo-1,2-di-negatively-substituted)ethylene compounds include dichlorofumaronitrile, dichloromaleonitrile, dimethyl dichloromaleate, N-phenyldichloromaleimide, 1,2-dibenzoyl-1,2-dichloroethylene, perfluorocyclobutene, 2,3-dichloro-1,1,1,4,4,4,-hexafluoro-2-butene, perfluoro-2-butene, 1,2-dibromo-1,2-dibenzoyl ethylene, trans-β-[2,4,6-trimethylbenzoyl]-dibromoacrylic acid methyl ester, 1,2-dichloro-3,3,4,4 - tetrafluorocyclobutene, 1,2 - dichloro - 3,3,4,4, 5,5 - hexafluorocyclopentene, 2,2,4,5 - tetrachloro - Δ⁴-cyclopentene-1,3-dione, and 4,5-dichloro-Δ⁴-cyclopentene-1,3-dione.

Dichlorofumaronitrile and dichloromaleonitrile can be prepared as described in U.S. Patent 2,443,494, N-phenyldichloromaleimide can be prepared as described by Anschutz and Beavis, Ann. 263, 159 (1891), perfluorocyclobutene can be prepared as described in U.S. Patent 2,436,142, while 2,3-dichloro-1,1,1,4,4,4-hexafluoro-2-butene and perfluorobutene-2 can be obtained from commercial sources.

In general, to react the monosodium derivative of an active methylene compound with a 1,2-dihalo-1,2-di(negatively-substituted)ethylene, one simply contacts these reactants with one another, preferably in an anhydrous liquid medium.

As a suitable liquid reaction medium, there can be used any liquid which is essentially inert to the reactants and reaction products. Thus, classes of suitable liquids include ethers, esters, N,N-disubstituted amides, nitriles, hydrocarbons, and alcohols. Mixtures of the above liquids and still other liquids can be used. Specific examples of suitable liquids include tetrahydrofuran, dioxane, ethylene glycol dimethyl ether, diethyl ether, petroleum ether, dimethylformamide, acetonitrile, and toluene.

A volume of liquid reaction medium sufficient to permit efficient mixing of the reactants is generally used. This volume is not critical but depends to some extent on both the nature of the particular reactants and the efficiency of the mixing apparatus. Generally the ratio of the volume of the reaction medium to the volume of reactants will be within the range of 1:1 to 10:1, but smaller or larger ratios can be used.

The temperature at which the contacting is carried out is not a critical factor in the practice of this invention, but a preferred range is from about 0° C. to 50° C. However, other temperatures ranging from −80° C. to 100° C. or even higher can be used.

The time allotted to the reactions of this invention is not critical and can be varied between wide limits. Generally, it is varied inversely with the temperature. Typical reactions can usually be completed within one to two hours.

For convenience, the reactions are usually conducted at normal atmospheric pressure, but pressures above atmospheric can be used and this is preferred when a reactant is a gas or low boiling liquid.

The reactor can be any conventional vessel of simple design constructed of any non-corrosive material such as glass, ceramic-ware, or stainless steel and provided with means for agitation, cooling, and heating, and equipped to protect the reactants from atmospheric contaminants.

The preferred molar ratios of alkali metal derivative of active methylene compound to 1,2-dihalo-1,2-di(negatively-substituted)ethylene is approximately 2:1, but ratios varying between wide limits such as about 1:10 to 20:1 can be used.

One preferred method for preparing compounds of this invention is by reaction in liquid media of a 1,2-dichloro-1,2-di(negatively-substituted)ethylene, e.g., dichlorofumaronitrile, with two molar proportions of the monosodium derivative of an active methylene compound, e.g., sodiomalononitrile, at 0° C. to 50° C. The liquid reaction medium is then removed from the reaction mixture by any convenient means such as distillation under reduced pressure and the residual crude product, which is a sodium 1-chloro-1,2,3,3-(tetrasubstituted)propenide (compound S in Equation 3), is mixed with 1–3 volumes of water in which it is generally soluble and (a) treated with a substituted ammonium halide which gives an ammonium 1-halo-1,2,3,3-(tetrasubstituted)propenide,

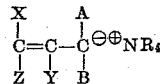

which can be separated by filtration and further purified by crystallization or (b) acidified with controlled amounts of a strong acid such as hydrochloric acid or the acid form of an ion exchange resin, e.g., "Amberlite IR-120-H," which gives the 1-halo-1,2,3,3-(tetrasubstituted) propenes

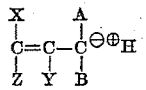

which can be extracted from the mixture with a solvent and purified by distillation in some instances or by crystallization in other instances. The 1-halo-1,2,3,3-tetrasubstituted propenes of Formula 1 often can be isolated as salts which can be crystallized from aqueous solutions merely by mixing an aqueous solution of the crude reaction mixture with an aqueous solution of an ammonium salt such as a tetraalkyl-substituted ammonium halide.

Of the compounds of this invention, either the free acid or a salt thereof can be used as a dye. The free acid is probably converted to a salt under the conditions used to dye the fabric. All of the compounds prepared are dyes. Those which contain basic groups are preferred.

The compounds of the present invention are useful as dyes for natural and synthetic fibers as illustrated in the following typical example:

A dye bath is prepared using 5,000 parts of water containing one part of a sulfonated lignin dispersant ("Marasperse CB," Marathon Company) and a solution of one part of the tetraethylammonium 1-chloro-1,2,3,3-tetracyanopropenide of Example 1 in 10 parts of methanol is added with stirring. The dye bath is heated to 90–95° C. and swatches of cellulose acetate, nylon, silk, and wool weighing five parts each are added. After a few minutes the cellulose acetate fabric is dyed a light yellow, the nylon fabric is dyed a bright yellow, and the wool and silk fabrics are dyed brownish-yellow.

EXAMPLE 1

*Tetraethylammonium 1-Chloro-1,2,3,3-Tetracyanopropenide*

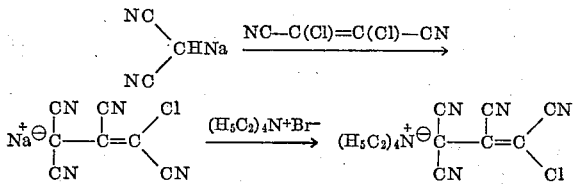

A mechanically stirred suspension of 52 parts of a 51.2% sodium hydride dispersion in mineral oil in 660 parts of anhydrous tetrahydrofuran is cooled to 5° C. under an atmosphere of nitrogen and a solution of 79 parts of malononitrile in 220 parts of anhydrous tetrahydrofuran is added dropwise during the course of about 15 minutes at 5–10° C. The mixture is stirred for an additional period of 30 minutes and a solution of 44 parts of dichlorofumaronitrile in 220 parts of anhydrous tetrahydrofuran is added dropwise during the course of about 15 minutes. The cooling bath is removed and the yellow reaction mixture is allowed to warm to 20° C. with stirring. After warming to 35° C., the tetrahydrofuran is recovered by distillation under reduced pressure from a bath at 35–40° C. The residual deep yellow solid is dissolved in about 250 parts of water and the pH of the solution is adjusted to about 8 by passage of carbon dioxide into the solution. A solution of 100 parts of tetraethylammonium bromide in about 200 parts of water is added slowly with stirring. After cooling to 5° C., the bright yellow crystals of tetraethylammonium 1-chloro-1,2,3,3-tetracyanopropenide are collected, washed first with cold 1% tetraethylammonium bromide and finally with a small volume of cold water. The filter cake is dissolved in about 3,500 parts of water by heating to 100° C., and about 10 parts of decolorizing charcoal is added. The solution is filtered and the clear, bright yellow filtrate is allowed to cool slowly to 5° C. The long, bright yellow needles are collected, washed with cold water, and air-dried. The yield is 70 parts and the compound melts at 129–131° C. with decomposition. The molecular extinction coefficient in methanol is 18,200 at 387 mμ.

*Analysis.*—Calcd. for $C_{15}H_{20}N_5Cl$: C, 59.89; H, 6.59; N, 22.92; Cl, 11.60. Found: C, 59.43; H, 6.74; N, 22.79; Cl, 11.60.

By using tetramethylammonium chloride, tetra-(n-propyl)ammonium iodide and triethylammonium chloride, and in place of tetraethylammonium bromide as described above, other salts of 1-chloro-1,2,3,3-tetracyanopropene are obtained. These results are summarized as Examples 7–9 in Table I.

EXAMPLE 2

*Tetramethylammonium 1,2-Dicarboxylic-1-Chloro-3,3-Dicyanopropenide N-Phenylimide*

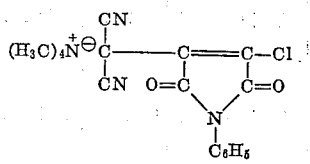

Sodium malononitrile is prepared as described in Example 1 in anhydrous tetrahydrofuran from 56 parts of a 51.2% sodium hydride dispersion in mineral oil and 80 parts of malononitrile. The sodium malononitrile suspension is treated with a solution of 73 parts of N-phenyldichloromaleimide in about 90 parts of warm anhydrous tetrahydrofuran at 5–7° C. The resulting bright orange solution is allowed to warm to 20° C., and then warmed to 35° C. The tetrahydrofuran is removed by distillation under reduced pressure from a bath at 35–40° C. and the resulting orange residue is dissolved in about 500 parts of warm water. The resulting deep orange solution is neutralized with carbon dioxide and 200 parts of tetramethylammonium chloride is added. The resulting orange crystals of tetramethylammonium 1,2 - dicarboxylic - 1 - chloro - 3,3 - dicyanopropenide N-phenylimide are collected by filtration, washed with cold 2.5% tetramethylammonium chloride, and air-dried. The yield of crude salt is 120 parts. Several crystallizations from methanol-water give 30 parts of orange crystals melting with decomposition at 230–235° C. The molecular extinction coefficient in methanol at 468 mμ is 12,200.

*Analysis.*—Calcd. for $C_{17}H_{17}O_2N_4Cl$: C, 59.22; H, 4.98; N, 16.27; Cl, 10.29. Found: C, 59.49; H, 5.01; N, 16.23; Cl, 10.26.

EXAMPLE 3

*Tetraethylammonium 1,2-Dicarbomethoxy-1-Chloro-3,3-Dicyanopropenide*

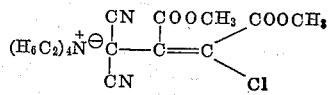

To a mechanically stirred suspension of 106 parts of sodium malononitrile prepared as described in Example 1 is added a solution of 64 parts of dimethyl dichloromaleate in 320 parts of anhydrous tetrahydrofuran at 5° C. On warming to 10° C., the reaction mixture turns light yellow and after stirring at 10–15° C. for several minutes, the reaction mixture is warmed to 50° C. and stirred for 15 minutes. The tetrahydrofuran is recovered by distillation under reduced pressure from the bath at 35–40° C., the yellow solid is dissolved in about 500 parts of water and the resulting solution is neutralized with carbon dioxide. About 200 parts of tetraethylammonium bromide is added and the aqueous layer is decanted from an oily layer that separates. The oily layer is obtained in crystalline form by stirring with fresh portions of 10% tetraethylammonium bromide. Crystallization from methanol-water gives 67 parts of pale yellow crystals of tetraethylammonium 1,2-dicarbomethoxy-1-chloro - 3,3 - dicyanopropenide melting at 88–90° C. The molecular extinction coefficient in methanol at 355 mμ is 29,400.

*Analysis.*—Calcd. for $C_{17}H_{26}O_4N_3Cl$: C, 54.88; H, 7.05; N, 11.31; Cl, 9.54. Found: C, 54.92; H, 7.07; N, 11.10; Cl, 9.54.

EXAMPLE 4

*3,3-Dicarboethoxy-1,2-Dicyano-1-Chloropropene*

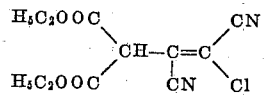

To 880 parts of anhydrous tetrahydrofuran is added 141 parts of a 51.2% sodium hydride dispersion in mineral oil and to the resulting mechanically stirred mixture at 5–10° C. under an atmosphere of nitrogen is added a solution of 500 parts of diethyl malonate in 440 parts of anhydrous tetrahydrofuran. After stirring for an additional period of 30 minutes, a solution of 147 parts of dichlorofumaronitrile in 220 parts of anhydrous tetrahydrofuran is added dropwise at 5–10° C. The resulting light yellow reaction mixture is allowed to warm to 20° C. and finally warmed to 50° C. The tetrahydrofuran is recovered by distillation under reduced pressure from a bath at 35–40° C., the residue is dissolved in a small volume of water, about 500 parts of ether is added and the aqueous layer is made slightly acid by the addition of hydrochloric acid. The ether layer is separated, dried with anhydrous magnesium sulfate, and the ether is removed by distillation on a steam bath. Fractionation of the residue gives 350 parts of diethyl malonate and 290 parts of 3,3-dicarboethoxy-1,2-dicyano-1 - chloropropene, B.P. 115–120° C. at 1 mm. The compound dissolves in dilute aqueous solutions of sodium hydroxide, sodium carbonate, and sodium bicarbonate to give yellow solutions.

*Analysis.*—Calcd. for $C_{11}H_{11}O_4N_2Cl$: C, 48.79; H, 4.10; N, 10.36; Cl, 13.10. Found: C, 48.93; H, 4.23; N, 11.00; Cl, 13.16.

EXAMPLE 5

*Tetramethylammonium 1,2-Dibenzoyl-1-Chloro-3,3-Dicyanopropenide*

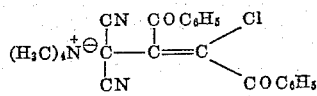

Sodium malononitrile is prepared essentially as described in Example 1 from 28 parts of a 51.2% sodium hydride dispersion in mineral oil and to the resulting mixture is added 92 parts of 1,2-dibenzoyl-1,2-dichloroethylene in 660 parts of tetrahydrofuran at 15–20° C. After warming to 50° C., the tetrahydrofuran is recovered by distillation under reduced pressure from a bath at 40–50° C. The residue is dissolved in about 500 parts of water, is treated with decolorizing charcoal and about 200 parts of tetramethylammonium chloride is added. The tetramethylammonium 1,2-dibenzoyl-1-chloro - 3,3 - dicyanopropenide separates as a gum that soon solidifies. Three crystallizations from methanol give 80 parts of deep yellow crystals melting at 210–212° C. with decomposition. The molecular extinction coefficient in methanol at 416 mµ is 27,000.

*Analysis.*—Calcd. for $C_{23}H_{22}O_2N_3Cl$: C, 67.70; H, 5.44; N, 10.31; Cl, 8.70. Found: C, 67.52; H, 5.42; N, 10.30; Cl, 8.62.

EXAMPLE 6

*Tetra-(n-Propyl)Ammonium 3,3-Dicyano-1-Fluoro-1,2-Bis(Trifluoromethyl)Propenide*

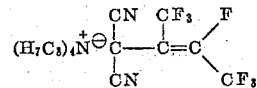

Sodium malononitrile is prepared essentially as described in Example 1 from 56 parts of a 51.2% sodium hydride in mineral oil and to the salt is added 120 parts of perfluoro-2-butene at 10° C. The resulting yellow reaction mixture is allowed to warm to 20° C. and the tetrahydrofuran is recovered by distillation under reduced pressure from a bath at 40–50° C. The residual thick, yellow oil is dissolved in about 250 parts of water, the solution is treated with decolorizing charcoal, then filtered, and about 100 parts of tetra-(n-propyl)ammonium iodide is added to the filtrate. The tetra-(n-propyl)ammonium 3,3-dicyano-1-fluoro - 1,2 - bis(trifluoromethyl)propenide separates as an oil that soon solidifies. Three crystallizations from methanol give 35 parts of pale yellow crystals melting at 84–86° C. The infrared spectrum shows strong absorption at 4.55µ and 4.70µ, characteristic of conjugated cyano groups, absorption at 6.1µ, characteristic for the

group, and strong absorption at 8µ, characteristic for the C–F group.

*Analysis.*—Calcd. for $C_{19}H_{28}N_3F_7$: C, 52.87; H, 6.54; N, 9.75; F, 30.88. Found: C, 53.06; H, 6.51; N, 9.74; F, 30.27.

Additional examples are summarized in Table I.

TABLE I.—1-HALO-1,2,3,3-TETRASUBSTITUTED PROPENES

| Ex. | Reactants, parts | | 1-halo-1,2,3,3-tetrasubstituted propenes | | | Cryst'n. solvent | M.P., °C. | Color | Ultraviolet spectra in methanol | |
|---|---|---|---|---|---|---|---|---|---|---|
| | Act. methylene cp'd. (as Na deriv.) | 1,2-dihaloethylene | (Acid form) | Salt (yield, parts) | Formula (salt) | | | | $\lambda_{max}$, mµ | $\epsilon$ |
| 1 | Malononitrile, 79. | Dichlorofumaronitrile, 44. | Cl CN CN<br>C=C—C—H<br>CN CN | Tetraethylammonium, 70. | $C_{15}H_{20}N_5Cl$ | $H_2O$ | 1 129–131 | Bright yellow. | 387 | 18,200 |
| 7 | do | do | Cl CN CN<br>C=C—C—H<br>CN CN | Tetramethylammonium. | $C_{11}H_{12}N_5Cl$ | $H_2O$ | 1 217–218 | do | 386 | 17,600 |
| 8 | do | do | Cl CN CN<br>C=C—C—H<br>CN CN | Tetra(n-propyl)ammonium. | $C_{19}H_{28}N_5Cl$ | $H_2O$ | 1 74–76 | do | 386 | 18,100 |
| 9 | do | do | Cl CN CN<br>C=C—C—H<br>CN CN | Triethylammonium. | $C_{13}H_{16}N_5Cl$ | $H_2O+CH_3OH$ | 1 63–65 | do | 387 | 17,200 |
| 10 | Ethyl cyanoacetate, 140. | do | Cl CN CN<br>C=C—C—H<br>CN COOC$_2$H$_5$ | Tetraethylammonium, 59. | $C_{17}H_{25}N_4O_2Cl$ | $H_2O+CH_3OH$ | 70–72 | do | 400 | 15,700 |
| 11 | p-Toluenesulfonylacetonitrile, 240. | Dichlorofumaronitrile, 88. | Cl CN CN<br>C=C—C—H<br>CN SO$_2$C$_6$H$_4$CH$_3$ | Tetramethylammonium, 160. | $C_{17}H_{19}N_4O_2SCl$ | $H_2O$+acetone | 1 124–126 | Yellow | 387 | 17,000 |
| 12 | Benzoylacetonitrile, 160. | do | Cl CN CN<br>C=C—C—H<br>CN COC$_6$H$_5$ | Tetramethylammonium. | $C_{17}H_{17}N_4OCl$ | $H_2O$+acetone | 159–161 | Bright yellow. | 414 | 17,100 |

See footnotes at end of table.

TABLE I.—1-HALO-1,2,3,3-TETRASUBSTITUTED PROPENES—Continued

| Ex. | Reactants, parts | | 1-halo-1,2,3,3-tetrasubstituted propenes | | | Cryst'n. solvent | M.P., °C. | Color | Ultraviolet spectra in methanol | |
|---|---|---|---|---|---|---|---|---|---|---|
| | Act. methylene cp'd. (as Na deriv.) | 1,2-dihaloethylene | (Acid form) | Salt (yield, parts) | Formula (salt) | | | | $\lambda_{max}$, m$\mu$ | $\epsilon$ |
| 13 | Benzoylacetonitrile, 160. | Dichlorofumaronitrile, 88. | Cl CN CN<br>C=C—C—H<br>CN  COC$_6$H$_5$ | Tetraethylammonium. | C$_{21}$H$_{25}$N$_4$OCl | H$_2$O+acetone | 118–119 | Bright yellow. | 420 | 16,200 |
| 14 | ___do___ | ___do___ | Cl CN CN<br>C=C—C—H<br>CN  COC$_6$H$_5$ | Tetra(n-propyl)ammonium. | C$_{25}$H$_{33}$N$_4$OCl | H$_2$O+acetone | 109–110 | ___do___ | 412 | 17,600 |
| 15 | Malononitrile, 80. | 2,3-dichloro-1,1,1,4,4,4-hexafluoro-2-butene, 140. | Cl CF$_3$ CN<br>C=C—C—H<br>CF$_3$  CN | Tetraethylammonium, 166. | C$_{15}$H$_{20}$N$_3$F$_6$Cl | H$_2$O+CH$_3$OH | 84–85 | Pale yellow. | | |
| 16 | Malononitrile, 66. | Perfluorocyclobutene, 81. | F  CN<br>C=C—C—H<br>CF$_2$—CF$_2$ CN | Sodium | | | | Orange [2] | | |
| 17 | 1,3-diphenyl-1,3-propanedione, 134. | Dichlorofumaronitrile, 45. | Cl CN COC$_6$H$_5$<br>C=C—C—H<br>CN  COC$_6$H$_5$ | Tetramethylammonium. | C$_{23}$H$_{22}$N$_3$O$_2$Cl | CH$_3$OH | 167–169 | Deep yellow. | 422 | 8,000 |
| 18 | α-Cyanoacetanilide, 160. | Dichlorofumaronitrile, 73. | Cl CN CN<br>C=C—C—H<br>CN  CONHC$_6$H$_5$ | Potassium | | | | Deep red. | | |
| 19 | Bis(phenylsulfonyl)methane, 59. | Dichlorofumaronitrile, 29. | Cl CN SO$_2$C$_6$H$_5$<br>C=C—C—H<br>CN  SO$_2$C$_6$H$_5$ | Tetramethylammonium. | | | | Yellow | | |
| 20 | Ethylbenzoylacetate, 22. | Dichlorofumaronitrile, 88. | Cl CN COC$_6$H$_5$<br>C=C—C—H<br>CN  CO$_2$C$_2$H$_5$ | Free acid, 35. Sodium | C$_{15}$H$_{17}$N$_2$O$_3$Cl | CH$_2$Cl$_2$+ether | 97–98 | Colorless. Deep yellow.[2] | | |

[1] Decomp.  [2] In aqueous solution.

Examples of other 1-halo-1,2,3,3-tetrasubstituted propenes and alkali metal and substituted ammonium salts which can be obtained by the process of the foregoing Example 1 are 1-chloro-1,2-dicyano-3-benzenesulfonyl-3-carboethoxypropene, 1-bromo-1,2-dibenzoyl-3,3-dicyanopropene, 2-(1,2-dicyano-2-chlorovinyl)indane-1,3-dione, and 1-bromo-1-carbomethoxy-2-(2,4,6-trimethylbenzoyl)-3,3-dicyanopropene.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

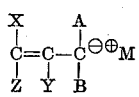

wherein

A and B individually represent a member of the group consisting of CN, COR, COOR, SO$_2$NR$_2$, SO$_2$R, CONR$_2$ and CONHR, R being aliphatically saturated monovalent hydrocarbon of 1–18 carbons;

A and B conjointly (—A—B—) are of the group consisting of

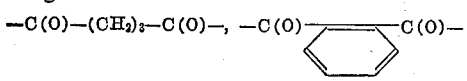

—CH=CH—CH=CH— and —C(O)—NH—C(O)—NH—C(O)—

X is a halogen atom;

Y and Z individually are of the group consisting of CN, COR, COOR, SO$_2$R, CONHR and CF$_3$, R being as defined above;

Y and Z conjointly (—Y—Z—) are of the group consisting of —C(O)—N(C$_6$H$_5$)—C(O)—,

—C(O)—CH$_2$—C(O)—

—C(O)—CCl$_2$—C(O)—

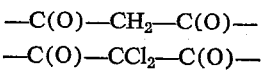 and —CF$_2$—CF$_2$—CF$_2$—; with the proviso that at least two of A, B, Y and Z are CN; and M is of the group consisting of hydrogen, an alkali metal cation, an alkaline earth metal cation, the ammonium cation, and an alkyl-substituted ammonium cation wherein each alkyl group contains 1–18 carbons.

2. An alkali metal 1-halo-1,2,3,3-tetracyanopropenide.

3. A tetraalkylammonium 1-halo-1,2,3,3-tetracyanopropenide wherein each alkyl group contains 1–18 carbons.

4. Tetraethylammonium 1-chloro-1,2,3,3-tetracyanopropenide.

5. Tetraalkylammonium-1,2-dicarboxylic-1-chloro-3,3-dicyanopropenide N-phenylimide wherein each alkyl group contains 1–18 carbons.

6. Tetramethylammonium 1,2-dicarboxylic-1-chloro-3,3-dicyanopropenide N-phenylimide.

7. Tetraalkylammonium - 1,2 - dicarbomethoxy - 1-chloro-3,3-dicyanopropenide wherein each alkyl group contains 1–18 carbons.

8. Tetraethylammonium 1,2-dicarbomethoxy-1-chloro-3,3-dicyanopropenide.

9. 3,3-dicarboethoxy-1,2-dicyano-1-chloropropene.

10. Tetraalkylammonium 1,2-dibenzoyl-1-chloro-3,3-dicyanopropenide wherein each alkyl group contains 1–18 carbons.

11. Tetramethylammonium 1,2-dibenzoyl-1-chloro-3,3-dicyanopropenide.

12. Tetraalkylammonium 3,3-dicyano-1-fluoro-1,2-bis(trifluoromethyl)propenide wherein each alkyl group contains 1–18 carbons.

13. Tetra-(n-propyl)ammonium 3,3 - dicyano-1-fluoro-1,2-bis(trifluoromethyl)propenide.

14. In a process for making the compounds of claim 1, the step of contacting in an inert anhydrous liquid reaction medium the monoalkali metal derivative of an active methylene compound of the formula $ACH_2B$, wherein A and B have the meanings assigned to them in claim 1, with a 1,2-dihalo-1,2-di(negatively-substituted)ethylene compound of the formula

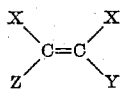

wherein X, Y and Z have the meanings assigned to them in claim 1 while maintaining temperatures ranging from −80° C. to 100° C., and the mole ratio of said monoalkali metal derivative of said active methylene compound to said 1,2-dihalo-1,2-di(negatively-substituted)ethylene being from about 1:10 to 20:1.

15. The process of claim 14 wherein said monoalkali metal derivative is a monosodium derivative.

16. The process of claim 14 wherein the temperature is 0° C. to 50° C. and said mole ratio is about 2:1.

References Cited in the file of this patent

UNITED STATES PATENTS

| | | |
|---|---|---|
| 2,766,135 | Middleton | Oct. 9, 1956 |
| 2,833,809 | Middleton | May 6, 1958 |
| 2,894,936 | Benson | July 14, 1959 |
| 3,030,408 | Inman et al. | Apr. 17, 1962 |

OTHER REFERENCES

Brunn: Chemical Abstracts, volume 8 (1914), page 2703.

Bergmann et al.: Berichte, volume 64 (1931), pages 1485–1493.

UNITED STATES PATENT OFFICE

CERTIFICATE OF CORRECTION

Patent No. 3,133,084                          May 12, 1964

Elmore L. Martin

It is hereby certified that error appears in the above numbered patent requiring correction and that the said Letters Patent should read as corrected below.

Column 2, line 28, after "salts," insert -- the monovalent anion formed by removal of the proton from --; column 6, lines 27 to 30, the formula should appear as shown below instead of as in the patent:

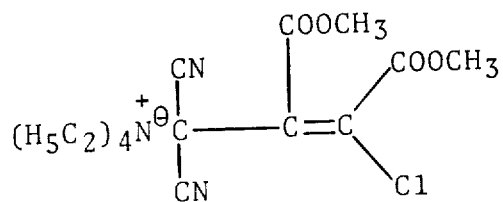

Signed and sealed this 13th day of October 1964.

(SEAL)
Attest:

ERNEST W. SWIDER
Attesting Officer

EDWARD J. BRENNER
Commissioner of Patents